US009245388B2

(12) United States Patent
Poulos et al.

(10) Patent No.: US 9,245,388 B2
(45) Date of Patent: Jan. 26, 2016

(54) INTERACTIONS OF VIRTUAL OBJECTS WITH SURFACES

(71) Applicant: MICROSOFT TECHNOLOGY LICENSING, LLC, Redmond, WA (US)

(72) Inventors: Adam G Poulos, Sammamish, WA (US); Evan Michael Keibler, Bellevue, WA (US); Arthur Tomlin, Kirkland, WA (US); Cameron Brown, Redmond, WA (US); Daniel McCulloch, Kirkland, WA (US); Brian Mount, Seattle, WA (US); Dan Kroymann, Kirkland, WA (US); Gregory Lowell Alt, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 282 days.

(21) Appl. No.: 13/893,146

(22) Filed: May 13, 2013

(65) Prior Publication Data

US 2014/0333666 A1    Nov. 13, 2014

(51) Int. Cl.
| G09G 5/00 | (2006.01) |
| G06T 19/00 | (2011.01) |
| G02B 27/01 | (2006.01) |
| G06F 3/147 | (2006.01) |

(52) U.S. Cl.
CPC ............ *G06T 19/006* (2013.01); *G02B 27/017* (2013.01); *G06F 3/147* (2013.01); *G02B 2027/014* (2013.01); *G02B 2027/0138* (2013.01); *G02B 2027/0178* (2013.01); *G02B 2027/0187* (2013.01); *G09G 2340/0464* (2013.01)

(58) Field of Classification Search
None
See application file for complete search history.

(56) References Cited

U.S. PATENT DOCUMENTS

| 7,701,439 | B2 | 4/2010 | Hillis et al. |
| 7,843,449 | B2 | 11/2010 | Krah |
| 2004/0046711 | A1 | 3/2004 | Triebfuerst |
| 2010/0245387 | A1* | 9/2010 | Bachelder et al. ............ 345/633 |
| 2012/0113223 | A1 | 5/2012 | Hilliges et al. |
| 2012/0169854 | A1 | 7/2012 | Seo et al. |

(Continued)

OTHER PUBLICATIONS

Otsuka, et al., "Transport: A Novel Approach to the Display and Transmission of 360 Degrees—Viewable 3d Solid Images", Retrieved at <<http://ieeexplore.ieee.org/stamp/stamp.jsp?tp=&arnumber=1580452>>, In Proceedings of IEEE Transactions on Visualization and Computer Graphics, vol. 12, No. 2, Mar. 2006, pp. 8.

(Continued)

*Primary Examiner* — Ryan R Yang
(74) *Attorney, Agent, or Firm* — Dan Choi; Judy Yee; Micky Minhas

(57) ABSTRACT

Embodiments are disclosed that relate to operating a user interface on an augmented reality computing device comprising a display system. For example, one disclosed embodiment includes displaying a virtual object via the display system as free-floating, detecting a trigger to display the object as attached to a surface, and, in response to the trigger, displaying the virtual object as attached to the surface via the display system. The method may further include detecting a trigger to detach the virtual object from the surface and, in response to the trigger to detach the virtual object from the surface, detaching the virtual object from the surface and displaying the virtual object as free-floating.

20 Claims, 7 Drawing Sheets

(56) References Cited

U.S. PATENT DOCUMENTS

2012/0223909 A1 9/2012 Tse et al.
2012/0249741 A1* 10/2012 Maciocci et al. ............... 348/46

OTHER PUBLICATIONS

Waugh, Rob, "Holograms Invade Your Home: New Games Could Project 3D Worlds into Your Living Room", Retrieved at <<http://www.dailymail.co.uk/sciencetech/article-2038127/Holograms-invade-home-New-games-project-jungle-living-room.html#axzz2KNCSiihv>>, Retrieved Date: Feb. 9, 2013, pp. 10.

Langhans, et al., "Felix 3D Display: An Interactive Tool for Volumetric Imaging", Retrieved at <<http://felix3d.com/web/download/paper_pw_02.pdf>>, In Proceedings of 14th International Symposium at Photonics West 2002 on Electronic Imaging: Science and Technology, Jan. 20, 2002, pp. 15.

Xue, et al., "A New 3D Display Using a Dynamically Reconfigurable", Retrieved at <<http://ieeexplore.ieee.org/stamp/stamp.jsp?tp=&arnumber=1500430>>, In Proceedings of Computer Graphics International, Jun. 22, 2005, pp. 8.

Piekarski, W. et al., "Augmented Reality Working Planes: A Foundation for Action and Construction at a Distance", In Proceedings of the Third IEEE and ACM International Symposium on Mixed and Augmented Reality, Nov. 2004, 10 Pages.

ISA European Patent Office, International Search Report and Written Opinion Issued in PCT/US2014/037614, Mar. 31, 2015, Netherlands, 12 Pages.

* cited by examiner

INTERACTIONS OF VIRTUAL OBJECTS WITH SURFACES

BACKGROUND

An augmented reality computing device may display virtual or holographic objects overlaid on an environment that includes real objects and real-world surfaces, e.g., walls, tables, etc. For example, a head-mounted display device may include a see-through display system configured to display images yet not obscure a real-world background viewable through the see-through display system.

SUMMARY

Embodiments for operating a user interface on an augmented reality computing device comprising a display system are disclosed. For example, one disclosed embodiment provides a method including displaying a virtual object via the display system as free-floating, detecting a trigger to display the object as attached to a surface, and, in response to the trigger, displaying the virtual object as attached to the surface via the display system. The method may further include detecting a trigger to detach the virtual object from the surface, and, in response to the trigger to detach the virtual object from the surface, detaching the virtual object from the surface and displaying the virtual object as free-floating.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1A:
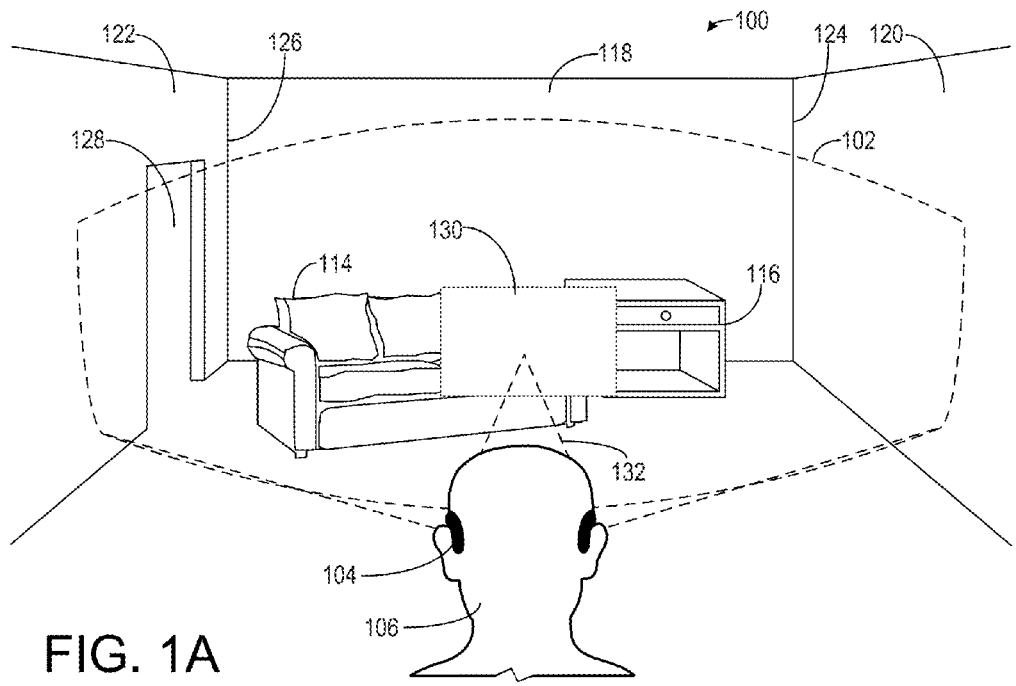
FIGS. 1A and 1B show a schematic depiction of an example use environment for an augmented reality computing system.

A see-through display system, e.g., a head-mounted display (HMD) device or other near-eye display device, may be used to present an augmented reality view of a background scene to a user. Such an augmented reality environment may include various virtual and real objects with which a user may interact via user inputs, such as speech inputs, gesture inputs, eye tracking inputs, motion inputs, and/or any other suitable input type.

Certain types of virtual objects may be desired by a user of a see-through display system to remain in view of the user without becoming too intrusive in the user's view. For example, a user of an augmented reality computing device may desire to have a floating holographic television follow the user around while they perform various tasks in an environment. Other example virtual objects that may be persistently displayed to a user in their field of view may include a floating holographic robot assistant or control panel interface which enables the user to change properties of the environment, e.g., to change a color of a room.

In order to keep such virtual objects in persistent view of a user while reducing intrusiveness of the virtual object on a user's field of view, in some examples, persistent virtual objects may be attached to real-world surfaces in the environment, e.g., attached to walls, so that the virtual object may float across the surface of the wall. For example, while displayed on a surface, a rotation of the virtual object may be aligned with the surface and may slide across the surface to a comfortable viewing position for the user. Similarly, virtual objects also may be attached to virtual surfaces, such as a virtual wall or other virtual environment structures.

However, various issues may arise in managing interactions of such persistent virtual objects with real-world surfaces in an augmented reality environment. For example, it may be desirable to permit user control of when and how virtual objects are attached to real-world surfaces. Further, the attachment of virtual objects to real-world surfaces may depend on a type and state of the virtual object and characteristics of the real-world surfaces. Additionally, as a persistent virtual object moves about a real-world environment, various environmental challenges may be present in transitioning the virtual object from a free-floating state to a surface-attached state and in transitioning the virtual object from one location to another in the environment.

Accordingly, embodiments are disclosed herein that relate to facilitating movement of persistent virtual objects through an augmented reality environment and managing attachments of virtual objects with real-world surfaces in the augmented reality environment. Briefly, the disclosed embodiments relate to displaying a virtual object on an augmented reality display device as free-floating, and, in response to a trigger to display the object as attached to a surface (real or virtual), displaying the virtual object as attached to the surface. The trigger may comprise any suitable condition or event, including but not limited to a user input and a threshold distance between the virtual object and the real-world surface. While embodiments presented below are described in the context of real-world surfaces, it will be understood the illustrated concepts may be used with any suitable surfaces, real or virtual. Likewise, while embodiments are described in the context of a see-through head-mounted display system, it will be understood that any other suitable type of augmented reality display system may be used. Examples include, but are not limited to, a portable device (e.g. tablet computer, smart phone, laptop computer, etc.) having a camera and a display configured to display image data acquired by the camera, wherein augmented reality images may be displayed on the display in the form of virtual objects composited with real-world image data acquired by the image sensor.

Figure 1B:
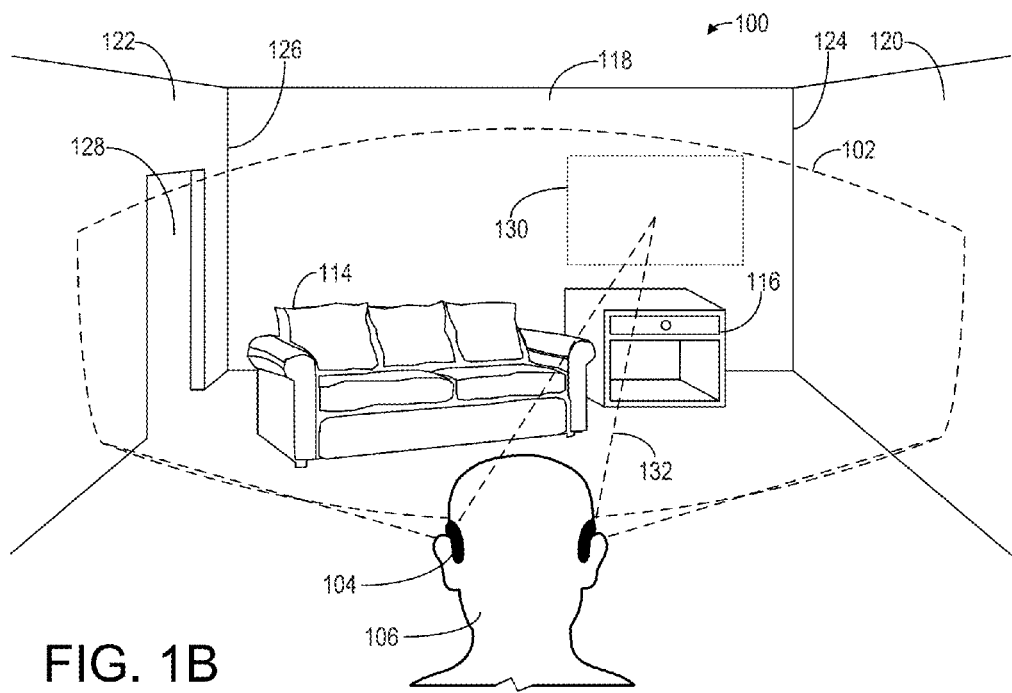

FIGS. 1A and 1B shows an example embodiment of a use environment for an embodiment of a head-mounted display device 104, wherein environment 100 takes the form of a living room. It should be understood that environment 100 is presented for the purpose of example, and that a use environment may take any other suitable form.

A user 106 is viewing the living room through an augmented reality computing device in the form of the see-through head-mounted display device 104, and may interact with the augmented environment via a user interface of display device 104. FIGS. 1A and 1B also depict a user field of view 102 comprising a portion of the environment viewable through the display device 104, and thus the portion of the environment that may be augmented with virtual images displayed via the display device 104. In some embodiments, the user field of view 102 may be substantially coextensive with the user's actual field of vision, while in other embodiments the user field of view 102 may occupy a lesser portion of the user's actual field of vision.

The augmented environment may include a plurality of real-world surfaces and real-world objects. For example, as shown in FIGS. 1A and 1B, the environment includes a couch 114, a table 116, a first wall or surface 118, a second wall 120, and a third wall 122. Further, the real-world surfaces in environment 100 may include various surface discontinuities, such as corners, doors, windows, real-world objects coupled to or adjacent to the surfaces, etc. Example surface discontinuities shown in FIGS. 1A and 1B include corner or discontinuity 124 at the interface of wall 120 with surface 118, corner 126 at the interface of surface 118 and wall 122, and a door 128 in wall 122. It should be understood that the example real-world surfaces shown in FIGS. 1A and 1B are non-limiting examples. Other example real-world surfaces may include exterior surfaces, e.g., a side of a building, glass shop fronts inside a shopping mall, and any other suitable surface.

As will be described in greater detail below, display device 104 may comprise one or more outwardly facing image sensors (e.g., two-dimensional cameras and/or depth cameras) configured to acquire image data (e.g. color/grayscale images, depth images/point cloud data, etc.) representing user environment 100 as the user navigates the environment. This image data may be used to obtain information regarding the layout of the environment (e.g., three-dimensional surface map, etc.) and objects contained therein, such as couch 114, table 116, wall 120, surface 118, wall 122, door 128, and corners or discontinuities 126 and 124. Further, the image data may be used to obtain information about characteristics or attributes of real-world surfaces in the environment. Example characteristics or attributes of real-world surfaces may include color, texture, shape, size, etc. As described in more detail below, such surface characteristics or attributes may be used in policies which specify how virtual objects interact with the real-world surfaces in the environment.

As remarked above, in some examples one or more virtual objects may be displayed to user 106 via see-through display device 104 so that the one or more virtual objects remain in the field of view 102 of user 106 as the user moves about or looks around the environment. For example, FIG. 1A shows an example virtual object 130 displayed as free-floating in environment 100 via see-through display device 104 to user 106. For example, free-floating virtual object 130 may be a free-floating holographic television which moves about the environment based on a location of user 106 within the environment 100 and/or based on a location of a gaze or focus 132 of the user 106 in the environment. Free-floating virtual object 130 may be any suitable virtual object, e.g., a planar objects such a floating virtual television or home automation control panel, or a non-planar 3-D virtual object such as flowers, plants, statues, art, etc.

FIG. 1A shows free-floating virtual object 130 displayed at a location of user focus 132 in environment 100. In some examples, the free-floating virtual object 130 may be persistently displayed at the location of user focus 132 even when the location of user focus changes. For example, if user 106 changes the location of focus 132 to a new location within environment 100 then virtual object 130 may be displayed at the new location in the environment so that the virtual object remains at a position in the environment where the user is gazing. For example, as described in more detail below, display device 104 may include various sensors to determine a location of user gaze or focus in the environment and/or orientation and/or posture of the user in the environment so that display of the free-floating virtual object may be adjusted accordingly. For example, a rotation of the free-floating object may be adjusted based on an orientation or body posture of user 106 in the environment.

In some examples, user 106 may desire to attach a free-floating virtual object, e.g., free-floating virtual object 130 shown in FIG. 1A, to a real-world surface in environment 100. For example, as shown in FIG. 1B, virtual object may be attached to real-world wall or surface 118 so that the virtual object does not obstruct the user's view of other objects in the environment. As another example, virtual object may be attached to a top surface of table 116, or attached to a position on couch 114, or attached to other suitable surfaces in environment 100.

Free-floating virtual object displayed in environment 100 may be attached and detached from a real-world surface in any suitable manner. For example, as shown in FIGS. 1A and 1B, user 106 may cause the free-floating virtual object 130 shown in FIG. 1A to move towards surface 118 by changing the position of user focus 132 from a first position shown in FIG. 1A to a second position of user focus 132 at a location proximate to surface 118 as shown in FIG. 1B, potentially in combination with another trigger. As described in more detail below, various triggers may be used to cause a virtual object to be displayed as attached to a real-world surface. For example, after moving the virtual object 130 to a location proximate to surface 118 by changing a location of gaze, the user may provide a voice command or speech input to attach the virtual object to surface 118. As another example, virtual object 130 may automatically be displayed as attached to surface 118 when certain environmental conditions are met, e.g., when a distance between the virtual object 130 and surface 118, or user 106 and surface 118, is less than a threshold distance. Further, as described in more detail below, various triggers may be used to detach a virtual object from a real-world surface or to move an attached virtual object along the real-world surface to which it is attached. For example, after a virtual object is attached to a real-world surface, in some examples, the virtual object may move along the real-world surface as the user changes position and/or gaze direction within the environment. However, in other examples, a virtual object attached to a real-world surface may be pinned to the real world surface so that the virtual object is displayed at a fixed location on the real-world surface.

In some examples, one or more policies may be obtained and used to manage attachment of persistent virtual objects with real-world surfaces. For example, policies may dictate one or more of which real-world surfaces the virtual object may be attached to and under what conditions the virtual object may be attached to a real-world surface. The virtual object may then be displayed on the see-through display system based on the one or more policies associated with the virtual object. In some examples, these policies may be specified at a time of creation of the object so that the policies are built into the object. In other examples, these policies may be based on user input to allow users to bias certain areas and specific holographic objects which would obtain or refrain from receiving specific characteristics.

For example, such policies may specify whether the virtual object can be attached to a particular real-world surface and/or whether the virtual object is pin-able to the real-world surface, e.g., whether or not the virtual object can be attached at a fixed location on the real-world surface. Further, such policies may depend on a type and/or state of the virtual object. For example, depending on a type and/or state of an object, the object may be permitted to attach to certain types of real-world surfaces and not permitted to attach to other types of real-world surfaces.

Further, these policies may specify how the attachment between a virtual object and a real-world surface is displayed. These policies may depend on various attributes of the real-world surfaces, e.g., as detected via one or more sensors in display device 104. For example, attributes of real-world surfaces such as a type of surface, e.g., "wall" or "table," surface transparency, e.g., translucent or opaque, surface texture, e.g., wood or glass, etc. may be determined and referenced in a policy associated with a virtual object to dictate how the virtual object is displayed relative to the real-world surface.

For example, if the virtual object is a floating holographic television, then the virtual object may be permitted to attach to an unobstructed area of a wall at a specified height, e.g., higher than five feet or some other height threshold, or may be permitted to attach to a table top but may not be permitted to attach to a couch in the environment. As another example, a virtual chess board object may be permitted to snap to a table surface but not be attached to a wall. As another example, a virtual poster may be permitted to snap to an unobstructed area of a wall but not onto a surface of a table. Further, the virtual poster may be permitted to only attach to a wall with a color that matches the virtual poster. As another example, a virtual television may be displayed as attached to a surface of a table at a bottom edge of the virtual television whereas when attached to a wall, the virtual television may be displayed with its back abutting the wall. As still another example, policies may specify padding space around a virtual object. For example, certain types of virtual objects may be displayed with a small amount of padding space around the object so that the virtual object is permitted to be displayed in a tight fit on a surface relative to surrounding surface features whereas other types of virtual objects may only be permitted to be displayed on surfaces which provide a large amount of padding space around the object.

Figure 2:
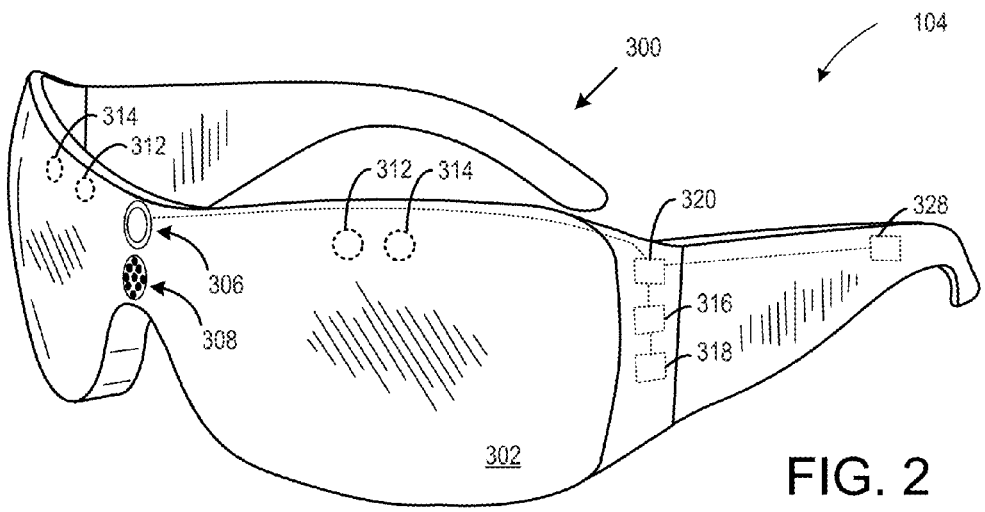
FIG. 2 schematically shows an example embodiment of an augmented reality display device.
Figure 3:
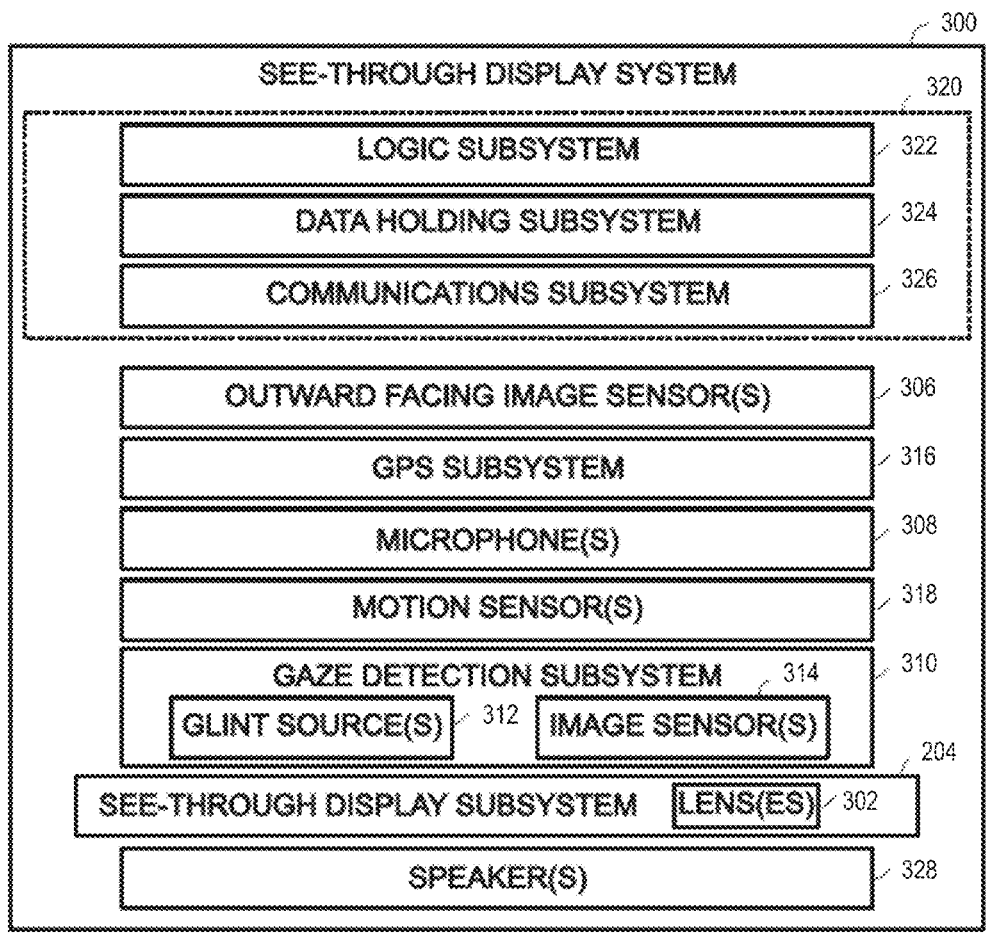
FIG. 3 is a block diagram of the display device of FIG. 2.

A see-through display device according to the present disclosure may take any suitable form, including but not limited to near-eye devices such as the head-mounted display device 104 of FIGS. 1A and 1B. FIG. 2 shows an example embodiment of a see-through display system 300, and FIG. 3 shows a block diagram of the display system 300.

Display system 300 comprises one or more lenses 302 that form a part of a display subsystem 304, such that images may be displayed via lenses 302 (e.g. via projection onto lenses 302, waveguide system(s) incorporated into lenses 302, and/or in any other suitable manner). Display system 300 further comprises one or more outward-facing image sensors 306 configured to acquire images of a background scene and/or physical space being viewed by a user, and may include one or more microphones 308 configured to detect sounds, such as voice commands from a user. Outward-facing image sensors 306 may include one or more depth sensors and/or one or more two-dimensional image sensors.

Display system 300 may further comprise a gaze detection subsystem 310 configured to detect a direction of gaze of each eye of a user or a direction or location of focus, as described above. Gaze detection subsystem 310 may be configured to determine gaze directions of each of a user's eyes in any suitable manner. For example, in the depicted embodiment, gaze detection subsystem 310 comprises one or more glint sources 312, such as infrared light sources, configured to cause a glint of light to reflect from each eyeball of a user, and one or more image sensors 314, such as inward-facing sensors, configured to capture an image of each eyeball of the user. Changes in the glints from the user's eyeballs and/or a location of a user's pupil as determined from image data gathered via the image sensor(s) 314 may be used to determine a direction of gaze. Further, a location at which gaze lines projected from the user's eyes intersect the external display may be used to determine an object at which the user is gazing (e.g. a displayed virtual object and/or real background object). Gaze detection subsystem 310 may have any suitable number and arrangement of light sources and image sensors.

Display system 300 may further comprise additional sensors. For example, display system 300 may comprise a global positioning (GPS) subsystem 316 to allow a location of the display system 300 to be determined. This may allow a user of display system 300 to be presented different groups of commands associated with selected objects at different locations, for example.

Display system 300 may further include one or more motion sensors 318 to detect movements of a user's head when the user is wearing display system 300. Motion data may be used, potentially along with eye-tracking glint data and outward-facing image data, for gaze detection, as well as for image stabilization to help correct for blur in images from the outward-facing image sensor(s) 306. The use of motion data may allow changes in gaze location to be tracked even if image data from outward-facing image sensor(s) 306 cannot be resolved. Likewise, motion sensors 318, as well as microphone(s) 308 and gaze detection subsystem 310, also may be employed as user input devices, such that a user may interact with the display system 300 via gestures of the eye, neck and/or head, as well as via verbal commands. It will be understood that sensors illustrated in FIGS. 2 and 3 are shown for the purpose of example and are not intended to be limiting in any manner, as any other suitable sensors and/or combination of sensors may be utilized.

Display system 300 further comprises a controller 320 having a logic subsystem 322 and a data holding subsystem 324 (which also may be referred to as a storage system) in communication with the sensors, gaze detection subsystem 310, and display subsystem 304. Data holding subsystem 324 comprises instructions stored thereon that are executable by logic subsystem 322, for example, to receive and interpret inputs from the sensors, to identify movements of a user, to detect user selection of one or more objects, and to perform actions or commands on selected objects, among other tasks.

It will be appreciated that the depicted display devices 104 and 300 are described for the purpose of example, and thus are not meant to be limiting. It is to be understood that the display device may include additional and/or alternative sensors, cameras, microphones, input devices, output devices, etc. than those shown without departing from the scope of this disclosure. Further, the physical configuration of a display device and its various sensors and subcomponents may take a variety of different forms without departing from the scope of this disclosure.

FIGS. 4-10 show example interactions of a user 106 wearing an augmented reality display device 104 with persistent virtual objects relative to real-world surfaces in an augmented reality environment. As remarked above, in some examples, a virtual object may be displayed as a persistent free-floating virtual object which follows a user's gaze about an environment. During certain conditions, it may be desirable to transition a display of such a virtual object from a free-floating state within the environment to an attached state where the virtual object is displayed at least partially attached to a real-world surface in the environment. Various triggers may be used to transition a virtual object from a free-floating state to an attached state.

Figure 4:
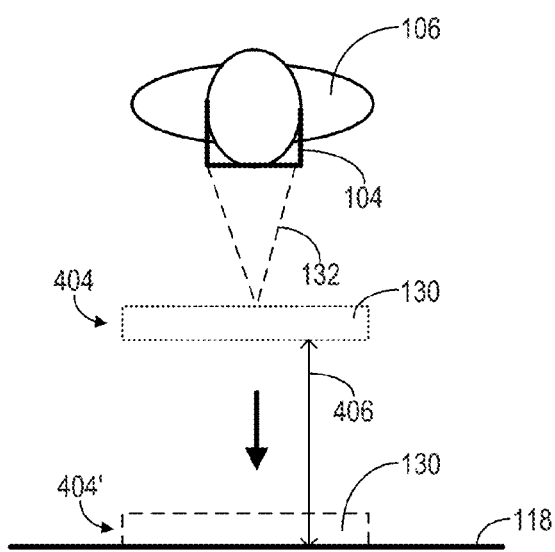
FIGS. 4-10 show example interactions of an augmented reality display device user with virtual objects in an augmented reality environment in accordance with the disclosure.

For example, FIG. 4 shows a free-floating virtual object 130 at a location 404 of a user focus 132 in an augmented reality environment. Free-floating virtual object 130 is a virtual object displayed to user 106 via see-through display device 104 as unattached to any real-world surface in the augmented reality environment. For example, FIG. 4 shows free-floating virtual object 130 at a location 404 within the environment as unattached or decoupled from real-world surface 118. For example, real-world surface 118 may be a wall, a glass window in a shop, a bill-board, etc.

Free-floating virtual object 130 at location 404 may be moveable within the augmented reality environment based on actions performed by user 106. For example, user 106 may input a speech command such as "grab" and then change a position of their focus 132 within the environment to move the free-floating object to a new location. As another example, the free-floating object may automatically move in response to a change in location of user focus 132 so that the free-floating virtual object is displayed at the point of focus or axis of gaze of the user, or at a location referenced to the point of focus or axis of gaze of the user.

As remarked above, in some examples, during certain conditions, user 106 may desire to attach a free-floating virtual object to a real-world surface within the environment in order to reduce intrusiveness of the virtual object in the user's field of view. Further, attaching a free-floating virtual object to surfaces in an environment may assist a user in using their spatial memory to locate objects in the environment. For example, a user might place virtual objects at certain real-world locations throughout their home and locate the object based on the known real-world location. As a more specific example, a user may know that their virtual television may be found in a corner of the kitchen as the user tends to look at that location while preparing dinner. Thus, the free-floating virtual object 130 at location 404 may transition to an attached position, shown at 404', on surface 118 in response to a trigger event. As one example, the trigger may comprise a speech input command to attach the virtual object to a surface adjacent to the virtual object. As another example, the free-floating virtual object may be automatically attached to surface 118 when a distance 406 between the virtual object and the surface is less than a threshold distance. In this way, the free-floating virtual object may appear to become "magnetized" to a proximate real-world surface and may automatically snap to the surface when the virtual object is moved by the user to a threshold distance from the surface. In some examples, the virtual object's orientation may be modified to match an orientation of surface 118 when the virtual object attaches to the surface. Modifying the object's orientation to match an orientation of a surface to which it is attached may help to prevent the virtual object from appearing to penetrate the real-world surface, and thereby help to maintain the illusion of the virtual object as existing in the real world environment.

Figure 5:
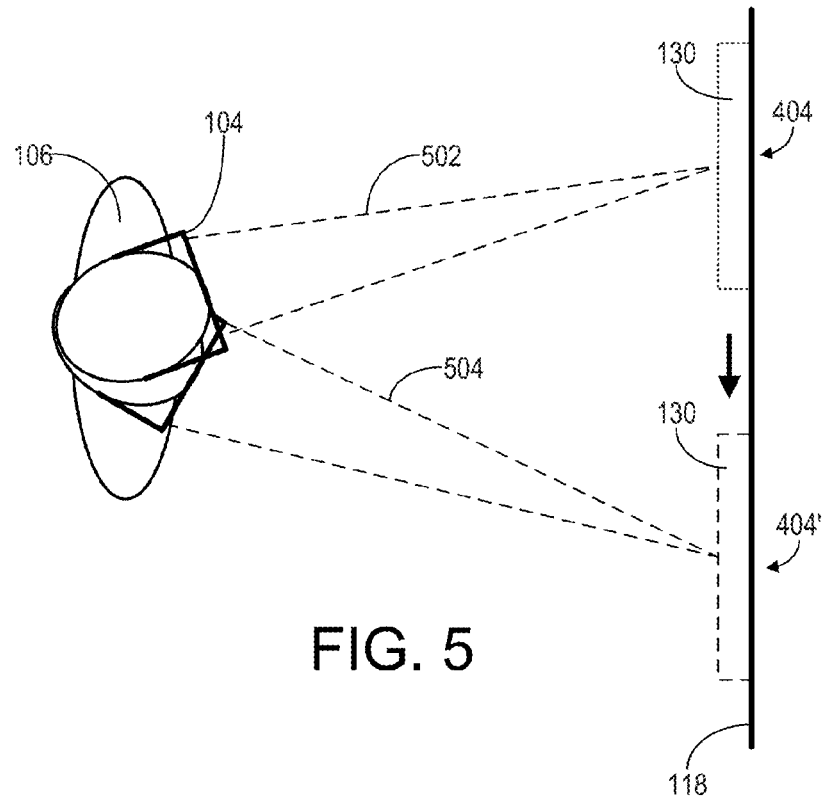

With reference to FIG. 5, in some examples, once the virtual object 130 is attached to the surface 118 at a location 404, the virtual object 130 may move or slide across or along the surface 118 based on a gaze location or position of focus of user 106. For example, FIG. 5 shows user 106 with a first position of focus 502 at a first time at a first location 404 along surface 118 where the virtual object 130 is attached. In response to a change in location of user focus or gaze, the attached virtual object may move along with the user focus while remaining attached to surface 118. For example, as shown in FIG. 5, at a second time following the first time, user 106 changes a location of user focus from the first position of focus 502 to a second, different, position of focus 504. In this example, the attached virtual object 130 moves from initial location 404 to a new location 404' so that the attached virtual object remains at the location of user focus.

Figure 6:
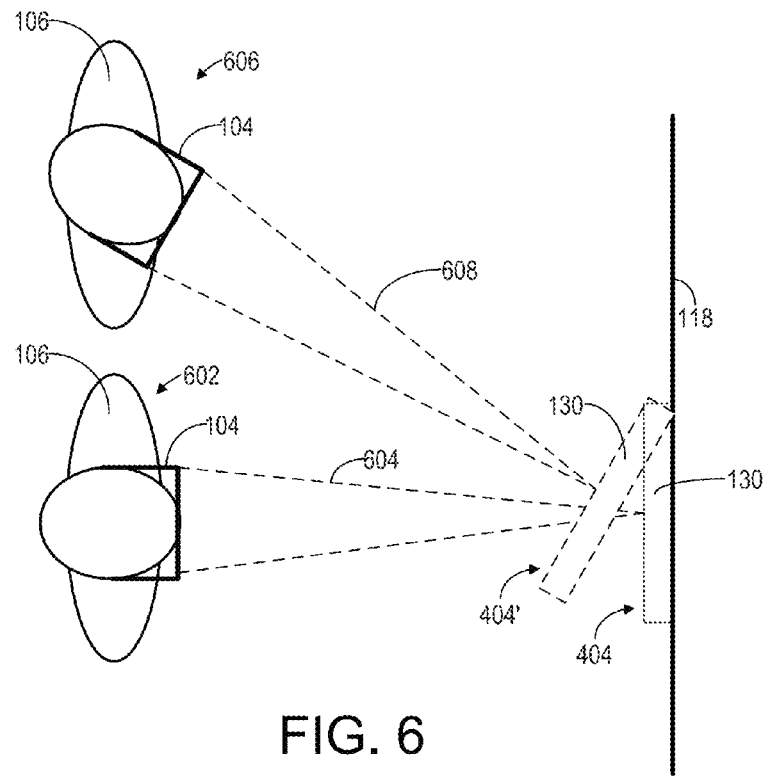

As shown in FIG. 6, in some examples, display of a virtual object 130 attached to surface 118 may be adjusted in response to a change in an orientation, rotation, or location of user 106 while remaining in a fixed location on surface 118. For example, the virtual object may be displayed as attached to surface 118 at a first orientation location 404 to the user at a first position 602 with a first direction of focus 604 substantially incident with surface 118. However, in response to a change in user position in the environment from the first position 602 to a second position 606, the virtual object may be displayed as attached to surface 118 at a second orientation location 404' so that the virtual object remains incident to the direction of focus 608 of the user at the second position 606.

Figure 7:
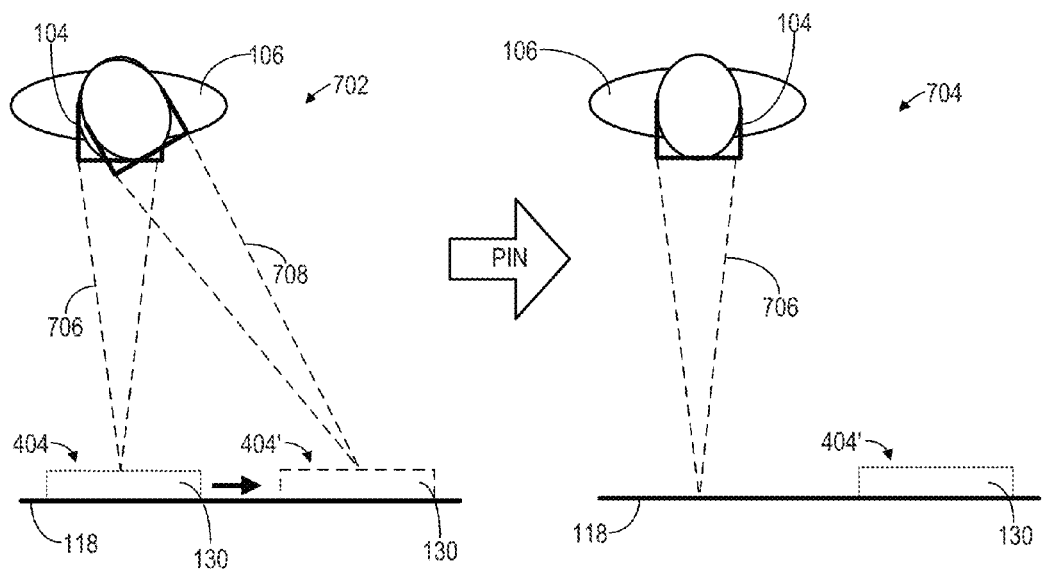

Turning to FIG. 7, as shown at 702, once a virtual object 130 is attached to the surface 118 at a location 404, the virtual object may move or slide across the surface 118 based on changes in user gaze direction or position of focus. For example, FIG. 7 shows user 106 with a first position of focus 706 at a first time at a first location 404 along surface 118 where the virtual object 130 is attached. In response to a change in location of user focus or gaze, the attached virtual object may move along with the user focus while remaining attached to surface 118. For example, as shown in FIG. 7 at 702, at a second time following the first time, user 106 changes a location of user focus from the first position of focus 706 to a second, different, position of focus 708 and the virtual object 130 in turn moves to a new location 404' on surface 118 corresponding to the second position of focus 708.

As shown in FIG. 7, in some examples, the attached virtual object at the new location 404' may become "pinned" to the surface so that the attached virtual object 130 becomes fixed at location 404' on surface 118. For example, user 106 may move the virtual object to the new location 404' and may provide input, e.g., a speech input, to pin the virtual object to the surface at its current location. In this example, the user moves virtual object 130 from the first attached location 404 to a new attached location at 404' and then provides input to fixedly attach the virtual object at location 404'. This pinning operating causes the object to freeze at its current location on the wall, no longer following the user's view. As shown in FIG. 7 at 704, after the virtual object is pinned to the location 404' the virtual object will be maintained at the fixed location 404' even when the user's gaze direction changes. For example, as shown at 704, the virtual object 130 remains at fixed location 404' even when the location of user focus returns to position 706.

Further, in some examples, pinned virtual object 130 shown at 404' may become unpinned from surface 118. For example, user 106 may provide input, e.g., speech input, to unpin the virtual object from its current fixed position at 404'. As another example, unpinning an object may be performed in response to an action performed by user 106. For example, user 106 may attempt to nudge virtual object 130 away from its current fixed position by focusing on the object and changing their point of focus away from the fixed position. If this change of user focus is greater than a threshold amount then the object may become unpinned. After, the virtual object is unpinned from the surface, the virtual object may again move along with changes in user focus while remaining attached to surface 118.

Figure 8:
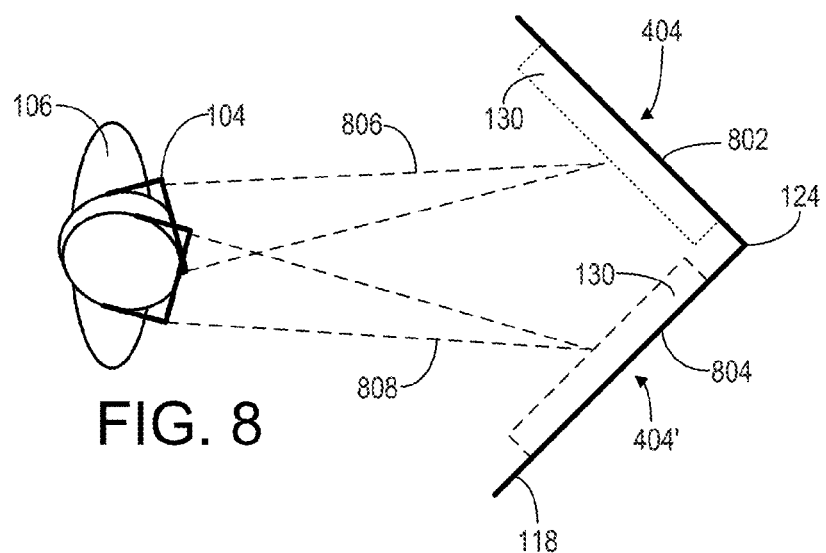
Figure 9:
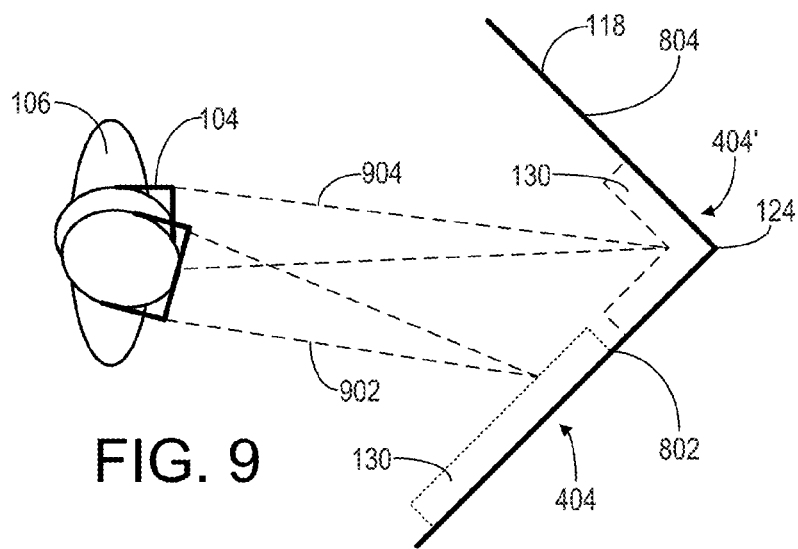
Figure 10:
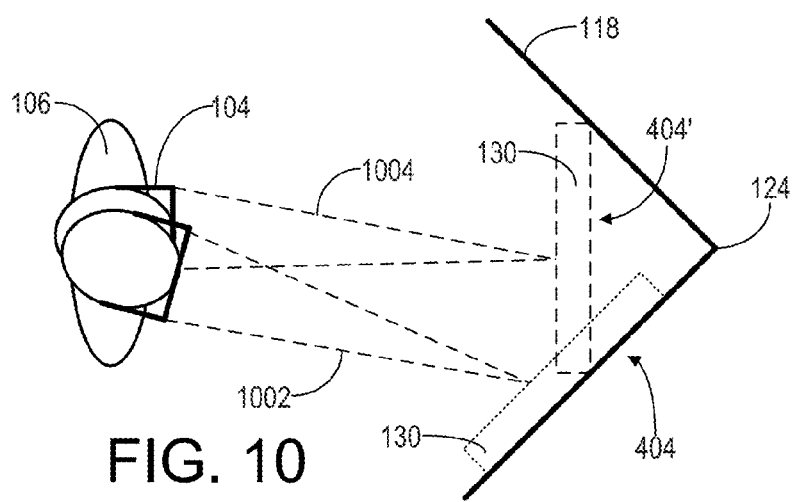

Real-world surfaces to which virtual objects may be attached may include various discontinuities which impede movement of a virtual object along the surface. Examples of discontinuities include corners, doors, windows, other objects attached to a real-world surface, etc. FIGS. 8-10 show various examples of moving a virtual object attached to a real-world surface 118 past a discontinuity 124 in the surface.

For example, FIG. 8 shows a jump or snap operation where the virtual object 130 is shown attached to the surface 118 with a discontinuity 124 at a first location 404 and then jumps or snaps past the discontinuity 124 to a second location 404'. For example, surface 118 shown in FIG. 8 may include a first real-world surface 802 interfacing with a second real-world surface 804 where the discontinuity 124 is at the interface of surface 802 with surface 804. A position of user focus 806 may initially be on surface 802 at location 404 where the virtual object 130 is initially attached. However, as the user changes the position of focus from focus 806 to focus 808 past the discontinuity 124 and onto surface 804, the virtual object snaps from location 404 to new location 404' on surface 804 past the discontinuity. For example, in response to an angle between a direction of user focus and the second real-world surface 804 meeting a threshold condition, the virtual object 130 may be displayed on the second real-world surface 804 and not displayed on the first real-world surface 802.

As another example, FIG. 9 shows a bend or deformation operation performed on the virtual object 130 as it moves across a discontinuity 124 in surface 118. For example, surface 118 shown in FIG. 9 may include a first real-world surface 802 interfacing with a second real-world surface 804 where the discontinuity 124 is at the interface of surface 802 with surface 804. A position of user focus 902 may initially be at a location 404 on surface 804 where the virtual object 130 is attached. However, as the user changes the position of focus from focus 902 to focus 904 at the discontinuity 124, the virtual object bends or deforms to accommodate the shape of the surface at the discontinuity so that a first portion of the virtual object is displayed on the first real-world surface 802 adjacent to the discontinuity and a second portion of the virtual object 130 is displayed on the second real-world surface 804 adjacent to the discontinuity. As the user continues to adjust their location of focus past the discontinuity toward surface 804, the virtual object continues to bend around the discontinuity so that the amount of the virtual object contained in the first portion displayed on second surface 804 increases until the entire virtual object is transitioned across the discontinuity to second surface 804.

As still another example, FIG. 10 shows a bridge or detachment operation performed on a virtual object 130 to move past a discontinuity 124 in surface 118. In this example, the user focus 1002 is initially at a location 404 on surface 118 where the virtual object is displayed as attached to surface 118. However, as the location of user focus changes from focus 1002 to focus 1004 at the discontinuity, the virtual object is detached from the real-world surface 118 at the discontinuity and then reattached at a location past the discontinuity. For example, as the user gaze approaches the discontinuity 124 by a threshold amount, the virtual object may be displayed as detached from surface 118 or may appear to bridge the discontinuity to move past it. It will be understood that the embodiments of FIGS. 8-10 are presented for the purpose of example and are not intended to be limiting in any manner, as a virtual object attached to a physical surface may be configured to handle a discontinuity of the physical surface in any other suitable manner.

Figure 11:
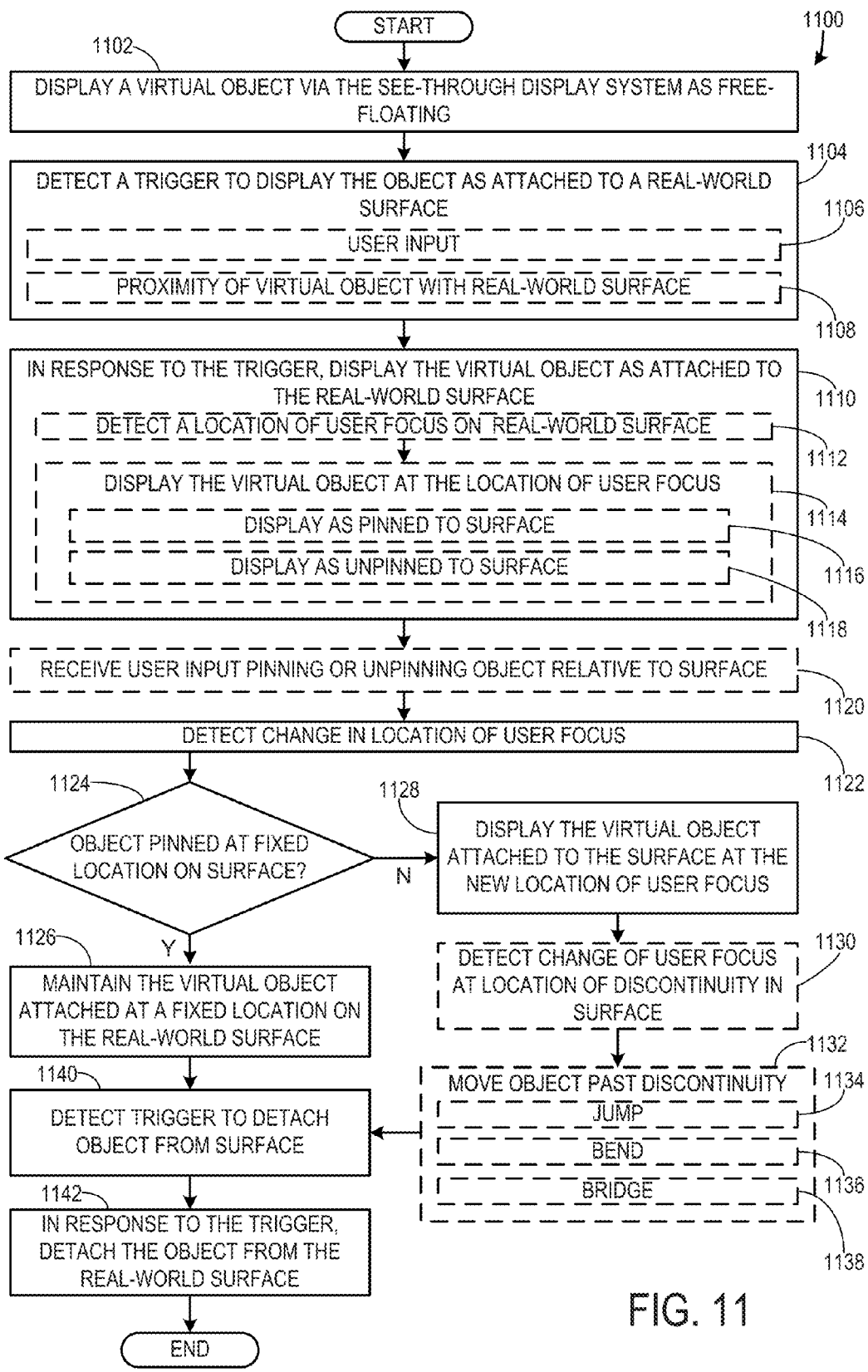
FIG. 11 shows an example method for operating a user interface on an augmented reality computing device in accordance with the disclosure.

FIG. 11 shows an example method 1100 for operating a user interface on an augmented reality computing device to manage attachment operations for persistent virtual objects in an augmented reality environment. For example, as described above, during certain conditions, virtual objects may be attached or detached from various real-world surfaces in the environment based on policies associated with the virtual object.

At 1102, method 1100 includes displaying a virtual object via the see-through display system as free-floating. For example, as shown in FIG. 1A, a virtual object 130 may be displayed via see-through display device as free-floating in environment 100.

At 1104, method 1100 includes detecting a trigger to display the virtual object as attached to a real world surface. For example, at 1106, a trigger may include user input, e.g., speech input, and method 1100 may include receiving user input to trigger an attachment of the virtual object to a real-world surface. As another example, the trigger may comprise a threshold distance between the virtual object or user and the real-world surface. Thus, at 1108, method 1100 may include determining a proximity of the virtual object or the user with the real world surface.

At 1110, method 1100 includes, in response to the trigger, displaying the virtual object as attached to the real-world surface via the see-through display system. Further, in some examples, the virtual object may be displayed as attached to the real-world surface based on policies associated with the virtual object. For example, one or more policies associated with the virtual object may be obtained, where the one or more policies dictate one or more of which real-world surfaces the virtual object may be attached to and under what conditions the virtual object may be attached to a real-world surface. The virtual object may be displayed on the see-through display system based on the one or more policies associated with the virtual object.

As remarked above, display of the virtual object as attached to the surface may be based on a location of user focus. For example, at 1112, method 1100 may include detecting a location of user focus on the real-world surface, e.g., via one or more sensors in display device 104. At 1114, method 1100 may include displaying the virtual object at the location of user focus on the real-world surface.

Further, at 1116, method 1100 may include displaying the virtual object as pinned to the surface. For example, the virtual object may be displayed on the see-through display system at a fixed location on the real-world surface that does not change based upon changes in the location of user focus. As another example, at 1118, method 1100 may include displaying the virtual object as unpinned to the surface so that the object can be moved about the surface while remaining attached to the surface.

It will be understood that, at any time, a user may choose to pin or unpin a virtual object relative to a surface to which it is attached. Thus, at 1120, method 1100 includes receiving user input pinning or unpinning the virtual object relative to the real-world surface. Pinning and unpinning may occur in any suitable manner. For example, as described above, in some embodiments the user may provide input, e.g., speech input, to pin or unpin the virtual object attached to the real-world surface.

At 1122, method 1100 includes detecting a change in location of user focus. For example, after displaying the virtual object as attached to the real-world surface via the see-through display system, a change in the location of user focus on the real-world surface may be detected. At 1124, method 1100 includes determining if the virtual object is pinned at a fixed location on the real-world surface. If the virtual object is pinned at a fixed location on the real-world surface at 1124, then method proceeds to 1126. At 1126, method 1100 includes maintaining the virtual object at a fixed location on the real-world surface.

However, if the virtual object is not pinned at a fixed location on the real-world surface at 1124, then method 1100 proceeds to 1128. At 1128, method 1100 includes displaying the virtual object attached to the surface at the new location of user focus. For example, in an unpinned state, a virtual object may move in response to changes in user focus or may be updated based on a change in a location of a gaze of a user so that the object remains in direct view of the user.

As mentioned above, a physical surface to which a virtual object is attached may comprise a discontinuity, such as a corner, an opening (e.g. a door), etc. Thus, at 1130, method 1100 optionally includes detecting a change of user focus at a location of discontinuity in the real-world surface. In some examples, this may include detecting a discontinuity between a first real-world surface and a second real-world surface. In response, at 1132, method 1100 includes moving the virtual object past the discontinuity in the real-world surface. For example, at 1134 the object may jump or snap to move past the discontinuity. As another example, at 1136, the object may bend or deform to move past the discontinuity. As still another example, at 1138, the object may bridge or detach from the surface to move past the discontinuity. For example, the virtual object may detach from the first real-world surface at the discontinuity and then reattach at a location past the discontinuity.

At 1140, method 1100 includes detecting a trigger to detach the virtual object from the real-world surface. For example, the trigger may include a user input, e.g., speech input, and/or a user action or gesture. At 1142, method 1100 includes, in response to the trigger, detaching the virtual object from the real-world surface and displaying the virtual object as free-floating.

In some embodiments, the methods and processes described above may be tied to a computing system of one or more computing devices. In particular, such methods and processes may be implemented as a computer-application program or service, an application-programming interface (API), a library, and/or other computer-program product.

Figure 12:
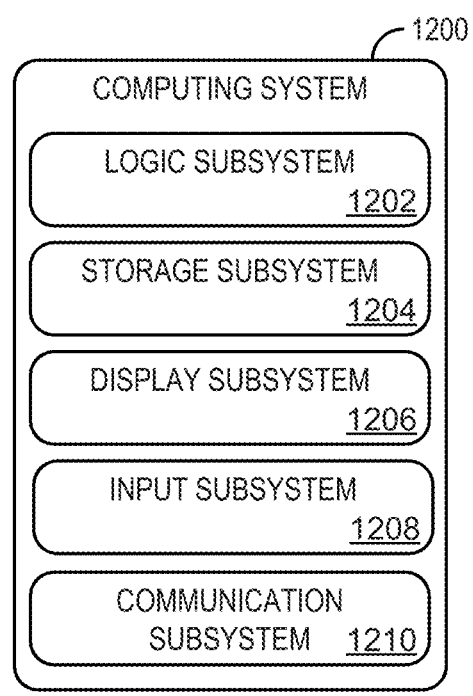
FIG. 12 schematically shows an example computing system.

FIG. 12 schematically shows a non-limiting embodiment of a computing system 1200 that can enact one or more of the methods and processes described above. Display device 104 may be one non-limiting example of computing system 1200. Computing system 1200 is shown in simplified form. It will be understood that virtually any computer architecture may be used without departing from the scope of this disclosure. In different embodiments, computing system 1200 may take the form of a display device, wearable computing device, mainframe computer, server computer, desktop computer, laptop computer, tablet computer, home-entertainment computer, network computing device, gaming device, mobile computing device, mobile communication device (e.g., smart phone), etc.

Computing system 1200 includes a logic subsystem 1202 and a storage subsystem 1204. Computing system 1200 may optionally include a display subsystem 1206, input subsystem 1208, communication subsystem 1210, and/or other components not shown in FIG. 12.

Logic subsystem 1202 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

The logic subsystem may include one or more processors configured to execute software instructions. Additionally or alternatively, the logic subsystem may include one or more hardware or firmware logic machines configured to execute hardware or firmware instructions. The processors of the logic subsystem may be single-core or multi-core, and the programs executed thereon may be configured for sequential, parallel or distributed processing. The logic subsystem may optionally include individual components that are distributed among two or more devices, which can be remotely located and/or configured for coordinated processing. Aspects of the logic subsystem may be virtualized and executed by remotely accessible, networked computing devices configured in a cloud-computing configuration.

Storage subsystem 1204 includes one or more physical devices configured to hold data and/or instructions executable by the logic subsystem to implement the methods and processes described herein. When such methods and processes are implemented, the state of storage subsystem 1204 may be transformed—e.g., to hold different data.

Storage subsystem 1204 may include removable media and/or built-in devices. Storage subsystem 1204 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard-disk drive, floppy-disk drive, tape drive, MRAM, etc.), among others. Storage subsystem 1204 may include volatile, nonvolatile, dynamic, static, read/write, read-only, random-access, sequential-access, location-addressable, file-addressable, and/or content-addressable devices.

It will be appreciated that storage subsystem 1204 includes one or more physical devices and excludes propagating signals per se. However, in some embodiments, aspects of the instructions described herein may be propagated by a pure signal (e.g., an electromagnetic signal, an optical signal, etc.) via a communications medium, as opposed to being stored on a storage device. Furthermore, data and/or other forms of information pertaining to the present disclosure may be propagated by a pure signal.

In some embodiments, aspects of logic subsystem 1202 and of storage subsystem 1204 may be integrated together into one or more hardware-logic components through which the functionally described herein may be enacted. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

When included, display subsystem 1206 may be used to present a visual representation of data held by storage subsystem 1204. This visual representation may take the form of a graphical user interface (GUI). As the herein described methods and processes change the data held by the storage subsystem, and thus transform the state of the storage subsystem, the state of display subsystem 1206 may likewise be transformed to visually represent changes in the underlying data. Display subsystem 1206 may include one or more display devices utilizing virtually any type of technology. Such display devices may be combined with logic subsystem 1202 and/or storage subsystem 1204 in a shared enclosure, or such display devices may be peripheral display devices.

When included, input subsystem 1208 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1210 may be configured to communicatively couple computing system 1200 with one or more other computing devices. Communication subsystem 1210 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1200 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof

The invention claimed is:

1. A method for operating a user interface of an augmented reality computing device comprising a display system, the method comprising:
   displaying a virtual object via the display system as free-floating;
   detecting a trigger to display the object as attached to a surface, wherein the trigger comprises a threshold distance between the virtual object and the surface; and
   in response to the trigger, displaying the virtual object as attached to the surface via the display system.

2. The method of claim 1, wherein the surface comprises a real-world surface.

3. The method of claim 1, further comprising updating displaying of the virtual object on the display system based on a change in a location of a gaze of a user.

4. The method of claim 1, further comprising obtaining one or more policies associated with the virtual object, where the one or more policies dictate one or more of which surfaces the virtual object may be attached to and under what conditions the virtual object may be attached to a surface, and displaying the virtual object on the display system based on the one or more policies associated with the virtual object.

5. The method of claim 1, further comprising:
   detecting a trigger to detach the virtual object from the surface; and
   in response to the trigger to detach the virtual object from the surface, detaching the virtual object from the surface and displaying the virtual object as free-floating.

6. The method of claim 1, further comprising:
   detecting a location of user focus on the surface; and
   displaying the virtual object on the surface at a location based upon the location of user focus.

7. The method of claim 6, wherein the surface is a first surface, and further comprising after displaying the virtual object as attached to the first surface via the display system, detecting a change in the location of user focus on the first surface and maintaining the virtual object attached at a fixed location on the first surface.

8. The method of claim 7, further comprising detecting a discontinuity on the first surface at a location of user focus, and detaching the virtual object from the first surface at the discontinuity and then reattaching the virtual object at a location past the discontinuity.

9. The method of claim 7, further comprising detecting a discontinuity between the first surface and a second surface, and displaying a first portion of the virtual object on the first surface adjacent to the discontinuity and a second portion of the virtual object on the second surface adjacent to the discontinuity.

10. The method of claim 7, further comprising detecting a discontinuity between the first surface and a second surface, and in response to an angle between a direction of user focus and the second surface meeting a threshold condition, displaying the virtual object on the second surface and not displaying the virtual object on the first surface.

11. The method of claim 1, wherein the virtual object comprises a holographic television display.

12. The method of claim 1, wherein the virtual object comprises a holographic robotic assistant.

13. The method of claim 1, wherein the virtual object comprises a holographic control interface configured to change one or more properties of a local environment.

14. On an augmented reality computing device comprising a see-through display system, a method for operating a user interface, the method comprising:
   detecting a location of user focus on a first real-world surface;
   displaying on the see-through display system a virtual object at the location of user focus on the first real-world surface;
   detecting a change in location of user focus to a new location on the first real-world surface;
   displaying on the see-through display system the virtual object at the new location of user focus on the first real-world surface;
   detecting a trigger to attach the virtual object to the first real-world surface, wherein the trigger comprises a threshold distance between the virtual object and the real-world surface; and
   in response to the trigger, displaying on the see-through display system the virtual object attached at a fixed location on the first real-world surface that does not change based upon changes in the location of user focus.

15. The method of claim 14, further comprising obtaining one or more policies associated with the virtual object, where the one or more policies dictate one or more of which real-world surfaces the virtual object may be attached to and under what conditions the virtual object may be attached to a real-world surface, and displaying the virtual object on the see-through display system based on the one or more policies associated with the virtual object.

16. The method of claim 14, further comprising, after displaying the virtual object attached at the fixed location on the first real-world surface on the see-through display system, detecting a second change in location of user focus on the first real-world surface and maintaining the virtual object attached at the fixed location on the first real-world surface.

17. The method of claim 14, further comprising:
detecting a trigger to detach the virtual object from the first real-world surface; and
in response to the trigger to detach the virtual object from the first real-world surface, detaching the virtual object from the first real-world surface and displaying the virtual object as free-floating.

18. A wearable augmented reality computing device, comprising:
a see-through display device;
a sensor system including one or more sensors;
a logic subsystem; and
a storage subsystem comprising instructions stored thereon that are executable by the logic subsystem to
detect a direction of user focus;
display on the see-through display device a free-floating virtual object based upon the direction of user focus;
detect a change in direction of user focus;
display on the see-through display device the free-floating virtual object in a different location based upon the change in direction of user focus;
detect a trigger to attach the free-floating object to a real-world surface;
in response to the trigger, display on the see-through display device the virtual object attached to a real-world surface at a location of user focus on the real-world surfaces;
detect a discontinuity on the real-world surface at the location of user focus; and
change the display of the free-floating virtual object according to the discontinuity.

19. The device of claim 18, wherein the real-world surface is a first real-world surface, and wherein
changing the display of the virtual object includes detaching the virtual object from the first real-world surface at the discontinuity and then reattaching the virtual object to the real-world surface at a location past the discontinuity.

20. The device of claim 18, wherein the real-world surface is a first real-world surface, and wherein
changing the display of the virtual object includes displaying a first portion of the virtual object as attached to the first real-world surface and a second portion of the virtual object as attached to the second real-world surface adjacent to the discontinuity.

* * * * *